United States Patent [19]

Banning et al.

[11] Patent Number: 4,977,499
[45] Date of Patent: Dec. 11, 1990

[54] METHOD AND APPARATUS FOR COMMANDING OPERATIONS ON A COMPUTER NETWORK

[75] Inventors: William L. Banning, Austin, Tex.; Harrison D. Ingles, Jr., Cary, N.C.

[73] Assignee: International Business Machines Corp., Armonk, N.Y.

[21] Appl. No.: 179,182

[22] Filed: Apr. 8, 1988

[51] Int. Cl.⁵ .................................................. G06F 1/00
[52] U.S. Cl. ................................... 364/200; 364/240.8; 364/242.94; 364/242.95
[58] Field of Search ... 364/200 MS File, 900 MS File; 370/91, 85; 340/825.52

[56] References Cited

U.S. PATENT DOCUMENTS

| | | |
|---|---|---|
| 4,506,360 | 3/1985 | Kryskow, Jr. et al. |
| 4,547,880 | 10/1985 | DeVita et al. ............ 370/91 |
| 4,559,614 | 12/1985 | Peek et al. |
| 4,574,363 | 3/1986 | Carlgren et al. |
| 4,575,817 | 3/1986 | Allen et al. |
| 4,584,679 | 4/1986 | Livingston et al. |
| 4,590,468 | 5/1986 | Steiglitz |
| 4,654,654 | 3/1987 | Butler et al. |
| 4,677,616 | 6/1987 | Franklin |
| 4,718,066 | 1/1988 | Rogard |
| 4,750,114 | 6/1988 | Murtle ......................... 364/200 |
| 4,771,286 | 9/1988 | Niessen et al. ............ 340/825.52 |
| 4,823,124 | 4/1989 | Beauchemim .............. 340/825.52 |
| 4,831,620 | 5/1989 | Conway et al. ............. 370/85 |
| 4,835,674 | 5/1989 | Collins et al. .............. 364/200 |

OTHER PUBLICATIONS

"PC Network Services for Distributed System Design", by Gregory Ennis, pp. 155-160.

"Expanding Capabilities in High Performance Networking", by Michael Durr, pp. 151-154.

Voice Transmission Through Local Area Networks, M. P. Callens et al., IBM Technical Disclosure Bulletin, vol. 28, No. 5, Oct., 1985, pp. 2108-2109.

"Overview How IBM Addresses LAN Requirements with the Token Ring", Norman C. Strole, *Data Communications*, Feb., 1986, pp. 120, 123, 124 and 127.

Physical Layer Repeater for Infrared Cableless Local Area Network, G. L. Clark et al., IBM Technical Disclosure Bulletin, vol. 29, No. 9, Feb., 1987, pp. 4205-4206.

Fundamentals of Local Area Networks, M. Tsukamoto, *Journal of The Japan Society of Precision Engineering*, Sep., 1987, pp. 1343-1349 (English language abstract only).

Communications Processor Netbios Gateway, J. J. Hoard, IBM Technical Disclosure Bulletin, vol. 30, No. 6, Nov., 1987, p. 33.

*Primary Examiner*—Raulfe B. Zache
*Attorney, Agent, or Firm*—E. Richard Zamecki

[57] ABSTRACT

Network interface software for use in a network of computers includes software providing protocols for transmission of messages without high level software acknowledgments required. Negative acknowledgments are relied on to indicate the failure of complete message reception.

12 Claims, 2 Drawing Sheets

METHOD AND APPARATUS FOR COMMANDING OPERATIONS ON A COMPUTER NETWORK

BACKGROUND OF THE INVENTION

1. Field of the Invention

The present invention pertains to systems in which two or more data processors, or computers, are arranged together in a network. More particularly, the present invention relates to protocols of application programming interfaces utilized in computer networks.

2. Description of Prior Art

Data processing systems, or computers such as personal computers (PCs) may be arranged in a local area network (LAN) for mutual communication. Typical available LANs may accommodate hundreds of thousands of PCs, and extend for several thousand meters, depending on the load that is placed on the network by the PCs. LANs may be configured in a variety of forms. For example, multiple PCs may be connected to a common bus, or connected to a ring, such as the token-ring network of International Business Machines Corporation (IBM). Another form of LAN connects the PCs in a multi-branch configuration known as a "tree". A particular LAN configuration may be selected in accordance with the requirements of the given application.

In each case, a PC is incorporated in a LAN within a node, which includes the PC, a network adapter and pertinent software providing an interface between the PC and the physical adapter. The adapter in turn is connected to other nodes to form the network. The network adapters provide the physical interfaces for the corresponding PCs to communicate with each other over the network.

The associated software utilizing the LAN includes various protocols that are effectively rules to govern communication over the network. Such rules, or protocols, are needed because multiple PCs in a network are sharing a common cable medium, and must communicate with each other over the cable medium reliably without interference from one another. In general, the protocols aid in such reliable communication, provide addressing for all computers on the network, and control the flow of data traveling between computers on the network. Typically, the protocols include such functions as data transmission, reception and acknowledgment over the cable.

The interface software utilized to operate a PC, or other computer, in a network may be considered to be structured in layers. An example of a LAN, or a portion of a LAN, is shown generally at 10 in FIG. 1, and includes two nodes designated as A and B. In node A, a PC A is indicated as being equipped with an adapter A including an adapter card, which is the physical layer 12 of the adapter A and which connects directly to the PC A. The necessary cable connections to the remainder of the network are made to the adapter card. The PC A may be equipped with application programming 14, which is the highest level software and is accessible by the user of the PC. At the other extreme of the layered software of node A is a low level link layer 16. The link layer software 16 is the communication control software proximate the remainder of the LAN 10 by way of the adapter card physical layer 12. The link layer 16 is generally largely responsible for assembling bits into data units for transmission by the physical layer 12, or for checking and assembling bits received from elsewhere in the network by the adapter A. When information is to be transmitted by node A, the link layer 16 puts the data into the correct format and detects any errors that might occur.

It will be appreciated from FIG. 1 that the link layer 16 of adapter A is provided with the adapter physical layer 12. Additional interface software may be input directly into the PC A. Such software includes an adapter support interface 18, for example. Such an adapter support interface 18 may be provided to allow the application program 14 to use the adapter card by providing control blocks in the PC memory and calling the adapter support interface with an interrupt instruction.

An additional interface software layer may be utilized to provide the command functions for communication on the LAN. By 1985, IBM had provided what may be considered an industry standard for an application programming interface in the form of a network basic input/output system (NETBIOS). PC A is shown equipped with NETBIOS 20 as the highest level of interface software in communication with the application programming 14.

Node B also includes a PC B to which is connected an adapter B as the physical interface between the PC B and the remainder of the network. A wiring system 22 is shown as connecting the two nodes A and B in the LAN 10 through their respective adapters.

As in the case of node A, node B includes several layers of software, the highest layer being application programming 24 to which the user of node B has access. NETBIOS 26 is provided for the command functions, and communicates through the adapter support interface 28 to the link layer software 30, which is provided with a physical layer adapter card 32 in the adapter B.

The various interface software layers may be provided either as incorporated in the adapter card or resident in the PC memory. It will be appreciated that additional software layers and features maybe included in a network node. Further, additional details of the software layers indicated in FIG. 1 are known in the industry and need not be described in detail herein, nor referred to for an explanation and understanding of the present invention. As discussed in detail hereinafter, the present invention may be provided as an improvement over NETBIOS as heretofore available.

In the NETBIOS version heretofore available, there exists a protocol generally identified by the command SEND, which is utilized in sending a message between two nodes in a LAN, once a NETBIOS session has been established between the two nodes For example, a message to be sent from PC A of node A to PC B of node B is input through the application programming 14 at PC A along with the command SEND. The message is then appropriately prepared by NETBIOS 20, and transmission is effected through the adapter A by the link software 16. When the message is received at the link layer software 30 of node B, through the corresponding adapter B, a link level acknowledgment is transmitted from node B to node A to indicate that a message has been received. This link level acknowledgment is itself then received as a message by the link level software 16 of node A.

If the message originally sent to node B is appropriately processed and communicated in its entirety to the user at PC B through the layers of node B software, an acknowledgment indicating that fact is originated by NETBIOS 26 of node B and sent, via the cable 22, to NETBIOS 20 of node A where such acknowledgment can be communicated to the PC A user through the application programming 14. If, however, the message originally sent to node B is not received, or not completely received, at the application level 24 of PC B, a response message to that effect will be transmitted by NETBIOS 26 of node B to NETBIOS 20 of node A for communication to the user at PC A. In either case, the acknowledgment regarding the receipt of the message at the application level 24 of PC B is originated after the message is processed by NETBIOS 26 and attempted to be conveyed to the user at PC B. Additionally, this acknowledgment is originated at a higher software level at NETBIOS 26 than the link level 30, and is more sophisticated than a link level acknowledgment which simply indicates that a transmission has been received at the node without giving details of the reception. Following the higher level NETBIOS acknowledgment to node A, node A sends a link layer acknowledgment to node B that the higher level acknowledgment has been received at node A.

A control flow diagram of the SEND function of NETBIOS is shown generally at 40 in FIG. 2. Starting at block 42, the user of the PC wanting to send a message inputs the message and initiates the SEND command. The SEND function is processed in the NETBIOS, as indicated in block 44, and is then transmitted by the adapter over the network cable, as indicated at block 46. The message initiating node must pause until transmission of the SEND message along the network to the receiving node is complete, as indicated by block 48. The link level acknowledgment that a transmission has been received at the link level of the receiving node signals completion of the transmission. When the transmission of the message is complete, the initiating node must await receipt of an acknowledgment indicating whether the transmitted message has been received by the PC user of the receiving node, as shown by block 50. As discussed hereinabove, the SEND function employs two additional acknowledgments. One such acknowledgment is a high level NETBIOS acknowledgment initiated by the receiving node to indicate whether all, a part, or none of the message was actually received by the application level of the receiving node. The other acknowledgment is sent by the link level software of the node which initiated the original message, to signal receipt of the high level acknowledgment from the message receiving node. Upon receipt of the complete acknowledgment called for in block 50, indicating receipt of the full message at the node B application level and including the link level response, the SEND command function is complete at block 52, and control is returned to the user of the message transmitting node in block 54 for further commands.

The control flow diagram 40 of FIG. 2 illustrates the operation of the SEND function in a circumstance where the message is received at the application level of the receiving node PC. If, for some reason, the message is not received at the PC application level, or is only partially received there, an appropriate high level NETBIOS response indicating same will be received by the message initiating node, which will respond with the link level acknowledgment, as the acknowledgments at block 50. Then, control will be returned to the user at block 54 when the session is ended, or some other action is taken.

It will be appreciated that the transmission and receipt of the higher level NETBIOS acknowledgment signal and the following link level acknowledgment described above require time, and therefore extend the time that the network is dedicated to communication between the nodes A and B actually for the original message from node A. During the time that the network is being used to complete the communication of the original message from node A to node B, including the aforementioned two acknowledgments, other messages are not being sent on that session between the two nodes A and B. For example, a simple request message sent from node A to node B seeking information may consume approximately 25 milliseconds. Each of the acknowledgments may typically account for 2.5 milliseconds of that time. It is advantageous and desirable from an efficiency standpoint as well as an economic one to minimize the protocols necessary for communication between nodes over the network. The present invention provides such an improvement by eliminating the last two acknowledgment signals while allowing complete use of the network as before.

SUMMARY OF THE INVENTION

The present invention provides techniques for operating a computer network, including two or more computers connected in the network in nodes, wherein each node includes a network adapter and network interface software. The interface software provides command functions and processes communications between the computers. Further, the interface software includes, at it lowest level, link layer software for communicating directly with the adapter hardware which is utilized to physically connect the corresponding node to a cable or the like, whereby the multiple computers are thus joined in a network. The network may comprise a local area network (LAN), and the network interface software may include network basic input/output systems (NETBIOS) application programming interfaces.

The present invention permits the initiation of a message at one computer, which message is then processed by the corresponding interface software, including having added thereto appropriate addressing information. Thereafter, the message is conveyed to the corresponding adapter hardware by the link level software and transmitted to another node in the network. A link level acknowledgment may be sent back to the message initiating node by the node to which the message is transmitted. Thereupon, the message transmission command function at the message initiating node is complete. The completion of this command function is accomplished without the transmission and receipt of a message received acknowledgment from a software level at the message receiving node higher than the link layer software.

The node receiving the message will effect a negative response, or negative acknowledgment, if the message is not entirely received at the application level of the receiving node. In that case, the next command initiated at the node at which the original message was initiated will be terminated, indicating to the user of the node having initiated the message the failure of some or all of the message to be received by the user at the other node.

The present invention thus provides method and apparatus for operating a computer network without waiting for an acknowledgment sent from a message receiving node and formulated at a higher software level than link level software to indicate the extent to which the message was received by the highest level software of the computer of the receiving node. The present invention is particularly useful when one node sends a query to another node, and is expecting a response.

DESCRIPTION OF PREFERRED EMBODIMENT

Figure 1:
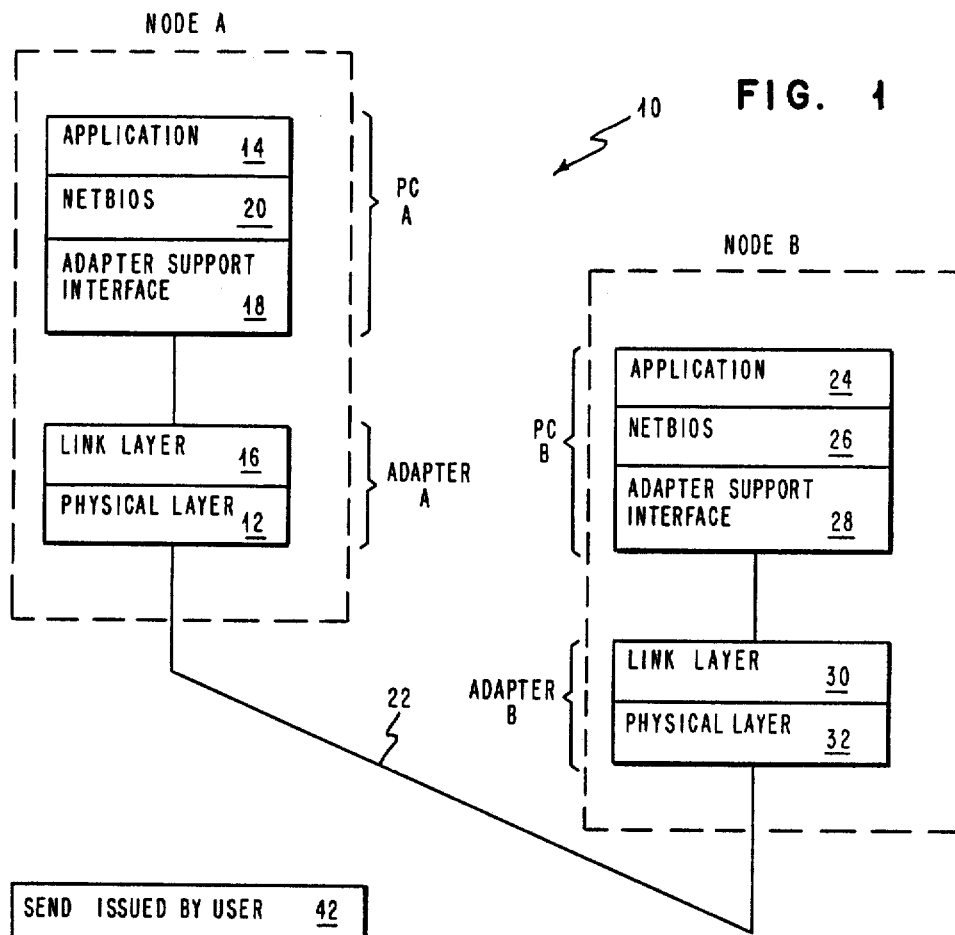
FIG. 1 is a schematic illustration of a LAN or LAN portion, including two PC nodes incorporating NETBIOS.
Figure 2:
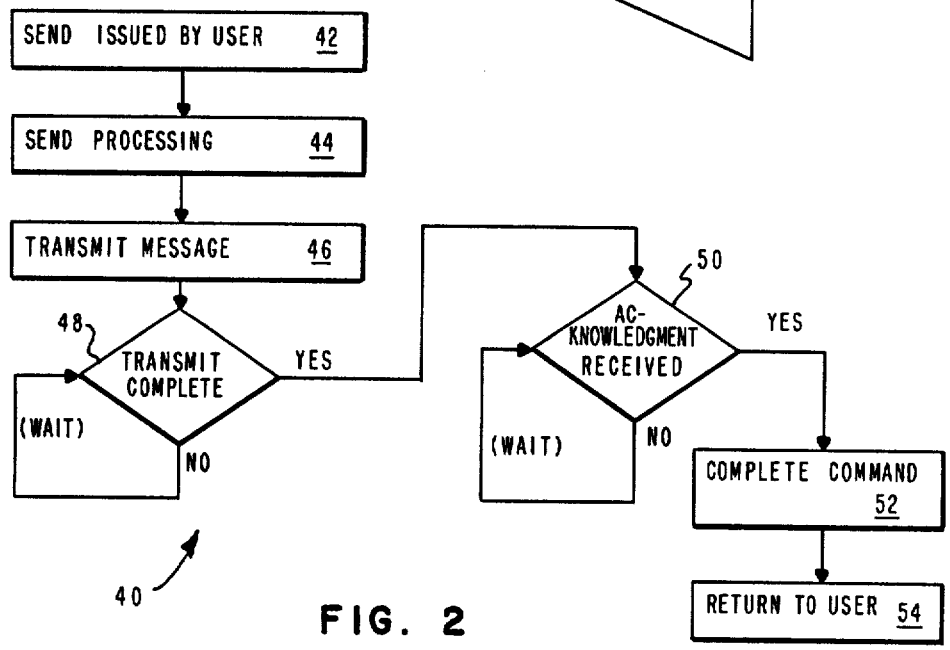
FIG. 2 is a control flow diagram illustrating the operation of the SEND function of NETBIOS as heretofore available.

Althought the present invention may be applicable to any computer network, it will be described herein for purposes of illustration as applied to a LAN utilizing NETBIOS. Consequently, a NETBIOS LAN or LAN portion, as generally illustrated at 10 in FIG. 1, may be considered for purposes of discussion as employing the present invention wherein functions of the present invention are either added to the heretofore available NETBIOS, or used to replace functions of the heretofore available NETBIOS. For example, rather than the SEND function discussed hereinabove and whose control flow diagram is illustrated in FIG. 2, the present invention provides a function which may be named SEND.NO.ACK. For purposes of disclosing the present invention the NETBIOS software 20 and 26 may be considered to be so improved by the present invention, rather than the heretofore available NETBIOS as discussed above.

The SEND.NO.ACK. function operates to transmit a message from one node to another node with minimal acknowledgment response. For example, if a message is to be sent from PC A to PC B of the LAN 10 of FIG. 1, the PC A user may send the message by commanding the SEND.NO.ACK. function in improved NETBIOS 20. The message is appropriately processed by the improved NETBIOS 20, and, with the necessary addressing information included, is conveyed to the adapter physical layer 12 by the link level software 16 for transmission along the cable 22 to the adapter physical layer 32 of node B. When the message is conveyed to the link level software 30 of node B, a link level acknowledgment is sent back to node A to indicate that a message has been received at node B. Node A is thus notified that the message transmission has been completed to the link layer 30. It will be appreciated that this link level acknowledgment in the case of the SEND.NO.ACK. function is transmitted upon completion of the receipt of the original message at the node B link layer without any delay due to processing of that message at node B, or a determination of whether the message may be conveyed to the PC B application layer 24.

Figure 3:
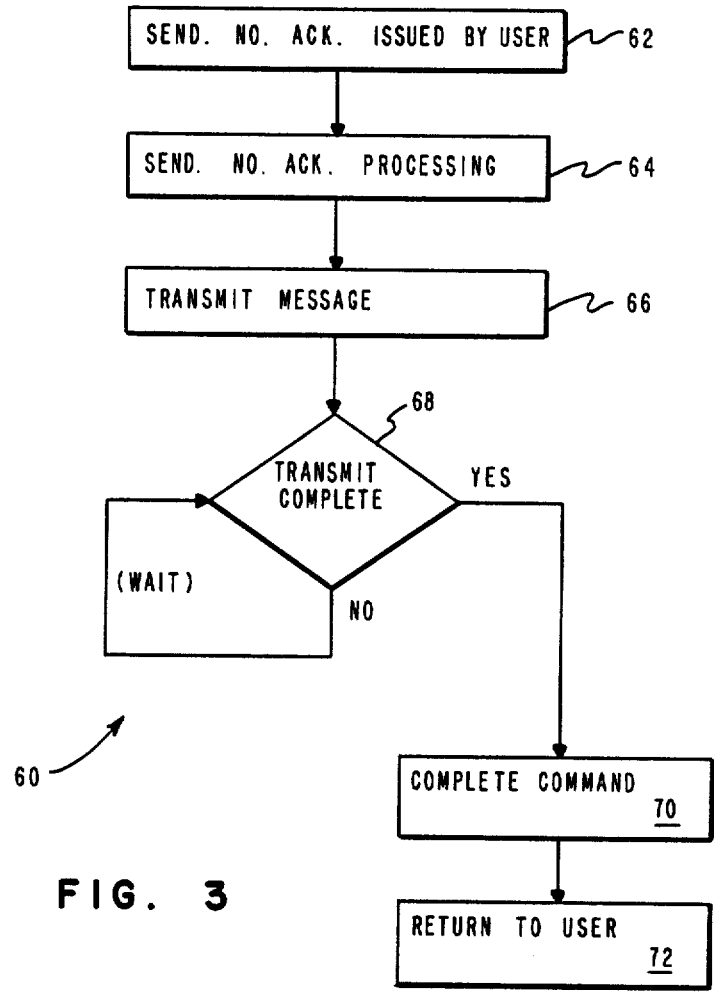
FIG. 3 is a control flow diagram illustrating the operation of the SEND.NO.ACK. function of the present invention.

FIG. 3 illustrate generally at 60 a control flow diagram for the function SEND.NO.ACK. To send a message from PC A of node A, for example, to PC B of node B in FIG. 1, using improved NETBIOS software 20 and 26, a user may input the message to PC A and command the SEND.NO.ACK. function, as indicated in block 62 of FIG. 3. Thereupon the improved NETBIOS software 20 processes the SEND.NO.ACK. command and accompanying message, adding appropriate address information, as indicated at box 64. The link level software 16 of the improved NETBIOS conveys the message in appropriate form to the adapter physical layer 12 for transmission along the cable 22 to the adapter of node B, as shown by block 66. Receipt of the message at the link level software 30 of node B causes initiation of a link level acknowledgment from node B back to node A to indicate that the message has been received at the node B link layer. From the point of view of the control flow diagram of the function at node A, illustrated in FIG. 3, the receipt of the link level acknowledgment from node B to so indicate transmission of the message to the node B link level software 30 is indicated by the query diamond 68. It will be appreciated, however, that the wait indicated associated with block 68 is extended only by the approximately 2.5 milliseconds needed for the link level acknowledgment to be send to node A in response to the original message being transmitted to node B. Thereupon, node A may assume a configuration indicative of the function SEND.NO.ACK. being completed, as indicated by block 70, and return control of the PC A to the user, as at 72.

At the receiving node B, several possibilities may occur. The PC B may or may not be in a condition for receiving a message at the application layer 24 through its corresponding improved NETBIOS 26. If the PC B is so configured to receive a message, then it may receive all or part of the message initiated by node A, depending, for example, on the capacity of the receive buffer of the PC B. If the receive buffer of PC B has sufficient capacity to receive the entire message initiated by node A, then the message will be completely received at the application layer 24. During the time of receiving of the message, or data, by PC B from node A, PC B is in a "receive" configuration. When the message from node A is completely received at the application layer of PC B, that PC will then assume its own "function receive complete" configuration, and return to the control of its user, thus indicating that the complete message has been received from node A.

If PC B is not in a "receive configuration" when the message from node A is transmitted to node B, a negative response, or negative acknowledgment, will be transmitted by the improved NETBIOS 26 of node B to node A. Similarly, if the receive buffer of PCB does not have sufficient capacity to accommodate the message initiated by node A, a negative response will be transmitted to node A. Other circumstances at node B which would prevent the complete conveyance of the message from node A to the application level of PC B would similarly initiate a negative response from node B to indicate that the message was not received at all, or was not entirely received, by PC B at the application level.

These negative responses are not acknowledgments in the sense of an acknowledgment initiated by NETBIOS as heretofore available and as described hereinabove in relation to box 50 in FIG. 2, for example. Rather, as indicated in FIG. 3, the SEND.NO.ACK. function utilized by node A according to the present invention does not wait for any such acknowledgment. However, the next command issued during that data transport session between nodes A and B by node A will either proceed forthwith, if there has been no negative response from node B, in the case of complete reception at the application level of PC B of the initial SEND.NO.ACK message from node A, or, in the event of a negative response from node B, the next command from node A will terminate. Termination of this next command will indicate to node A and its user that some or all of the previous message sent via SEND NO-.ACK. was not received by PC B at its highest level.

The negative responses are not perceived by the user of the node initiating the original message to be transmitted until another command is attempted at that node, and then only if such a negative response had been sent. Further, the termination of a subsequently attempted command by a negative response simply indicates to the user at the transmitting node that the message was not entirely received at the application level of the other node, without indicating how much, if any, of the message was received at that level.

It will be appreciated that the form of function of the present invention, illustrated by SEND.NO.ACK. herein, is applicable to other command functions. For example, NETBIOS as heretofore available also provides a CHAIN SEND function which differs from the SEND function in that the latter utilizes a single buffer from which to assemble the message to be sent, whereas the CHAIN SEND command utilizes a plurality of buffers. Thus, a CHAINED.SEND.NO.ACK. function, for example, operates as the SEND.NO.ACK. described herein with the difference that the former function may draw from more than one buffer to assemble data for transmission. In general, the present invention provides function capability without waiting for high software level acknowledgments of data received, but instead may rely on the lack of a negative response, or the receipt of one, to interpret the accomplishment or failure, respectively, of complete reception at the highest software level of data transmitted to a PC in the network.

The foregoing disclosure and description of the invention is illustrative and explanatory thereof, and various changes in the method steps as well as in the details of the apparatus may be made within the scope of the appended claims without departing from the spirit of the invention.

What is claimed is:

1. A system comprising two or more computers, equipped with application programming and connected in a network for intercommunication, comprising:
   a. a plurality of nodes with each node including one said computer and a network adapter;
   b. multiple levels of interface software in each node, providing command functions and including means for processing messages initiated at the computer of the node for transmission to another computer in the network;
   c. link software as part of said interface software for communicating with the corresponding adapter;
   d. means connecting said nodes in the network configuration through said adapters;
   e. means, as part of each network adapter, for effecting transmission of messages from one node to another node in said network; and
   f. means as part of said interface software for completing a message transmission command without waiting for acknowledgment from a node to which the message was transmitted, above the level of said link software.

2. A system as defined in claim 1 wherein said network comprises a local area network.

3. A system as defined in claim 1 or claim 2 wherein said interface software comprises a network basic input-/output system application programming interface.

4. A system as defined in claim 1 further comprising means, as part of said interface software, for implementing a response by a node to which said message transmission was sent if said message was not entirely received at the application programming of the computer of this node.

5. A system as defined in claim 1 further comprising means, included in a node, for ending the next command instituted by that node subsequent to a message transmission command instituted by the same node if said message transmission has not been completely received at the application programming of the computer of another node to which the message has been transmitted.

6. A method of operating a computer network comprising two or more computers, equipped with application programming and arranged individually in nodes, including in each node a network adapter and interface software, the lowest level software of which comprises link software, comprising the following steps:
   a. at one such computer initiating a message for transmission to another computer in said network;
   b. commanding transmission of said message over said network;
   c. utilizing said interface software for processing said message, including adding thereto appropriate address information;
   d. transmitting said message over said network to the other computer; and
   e. ending said command function without waiting for receipt of an acknowledgment from software at the receiving node above said link level software.

7. A method as defined in claim 6 wherein said computer network comprises a local area network.

8. A method as defined in claim 6 or claim 7 wherein said interface software comprises a network basic input-/output system application programming interface.

9. A method as defined in claim 6 further comprising the step of acknowledging receipt of a transmission at the node receiving said transmission by a link level acknowledgement signal transmitted to the node at which said message was initiated before said command function is so ended.

10. A method as defined in claim 6 further comprising transmitting a response to said node at which said message was initiated, indicating the failure of receipt of the entire message at the application programming of the computer of the node to which said message was transmitted.

11. A method as defined in claim 6 further comprising the step of ending the next command initiated at the node at which the message was initiated if receipt of that message was not complete at the application programming of the computer of the node to which that message was transmitted.

12. A method as defined in claim 6 further comprising initiating said message utilizing two or more buffers of said computer at which said message is initiated.

* * * * *